United States Patent [19]

van der Vlis et al.

[11] 4,288,699

[45] Sep. 8, 1981

[54] STORAGE RACK FOR THE STORAGE OF FUEL ELEMENTS OF NUCLEAR REACTORS

[75] Inventors: Adrianus van der Vlis, Vlaardingen; Evert C. Boucherie, Kortgene, both of Netherlands

[73] Assignee: De Rotterdamsche Droogdok Maatschappij B.V., Rotterdam, Netherlands

[21] Appl. No.: 27,852

[22] Filed: Apr. 6, 1979

[30] Foreign Application Priority Data

Apr. 7, 1978 [NL] Netherlands ..................... 7803742

[51] Int. Cl.³ .............................................. G21F 5/00
[52] U.S. Cl. ................................... 250/507; 250/506
[58] Field of Search ....................... 250/506, 507, 518; 176/87, DIG. 2

[56] References Cited

U.S. PATENT DOCUMENTS

| | | | |
|---|---|---|---|
| 3,037,120 | 5/1962 | McDaniels | 250/506 |
| 4,034,227 | 7/1977 | Soot | 250/507 |
| 4,042,828 | 8/1977 | Rubinstein et al. | 250/507 |
| 4,044,267 | 8/1977 | DeVilacqua | 250/507 |
| 4,119,859 | 10/1978 | Karzmar et al. | 250/507 |

Primary Examiner—Bruce C. Anderson
Attorney, Agent, or Firm—Fleit & Jacobson

[57] ABSTRACT

Storage rack for nuclear fuel elements, consisting of a lattice construction, constituted by a first arrangement of parallel, vertical and equally spaced relatively long sheet elements, having sharply shaped contours and a second arrangement of parallel, vertical equally spaced relatively short aligned sheet elements, having sharply shaped contours, each bridging the distance between the relatively long sheet elements, such that a plurality of adjoining vertical storage cases is formed, having a rectangular horizontal cross section, each for receiving one nuclear fuel element. The relatively short sheet elements are provided with lugs at their opposite long edges engaging the surface of the relatively long sheet elements, said lugs fit in accurately formed slots in the relatively long sheet elements for connecting the sheet elements by means of a keying.

13 Claims, 13 Drawing Figures

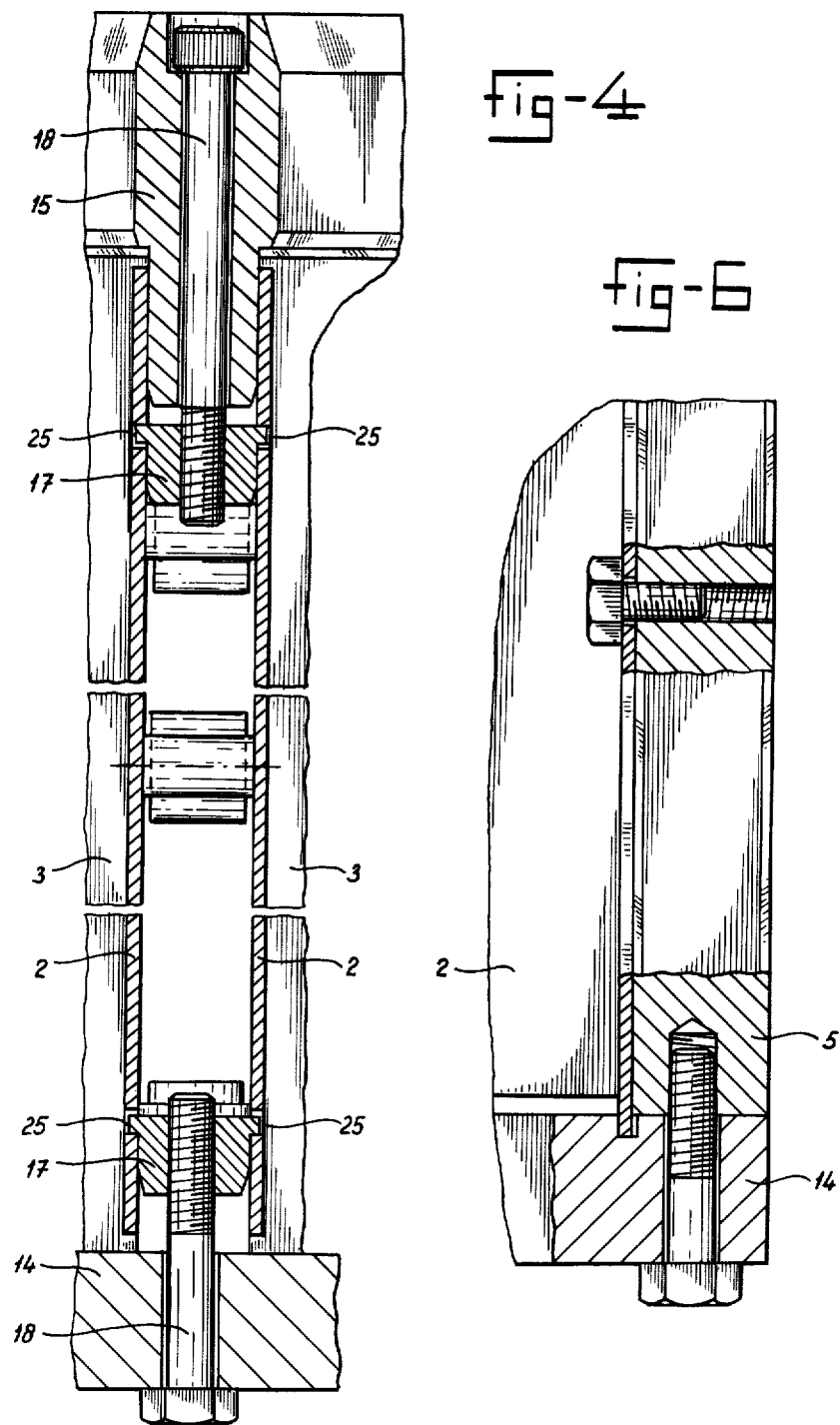

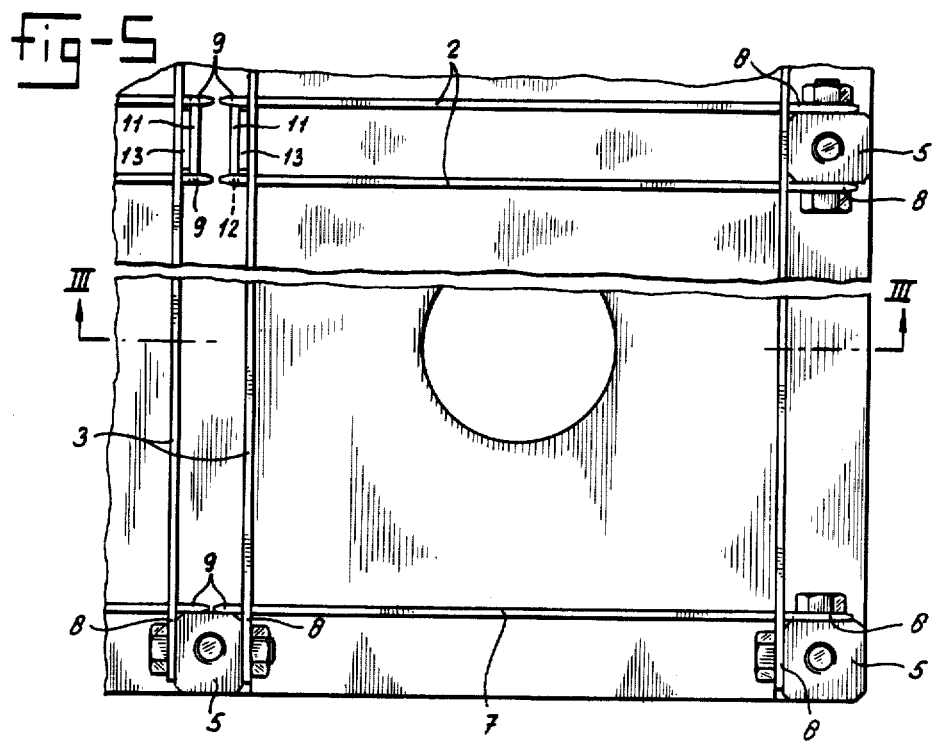
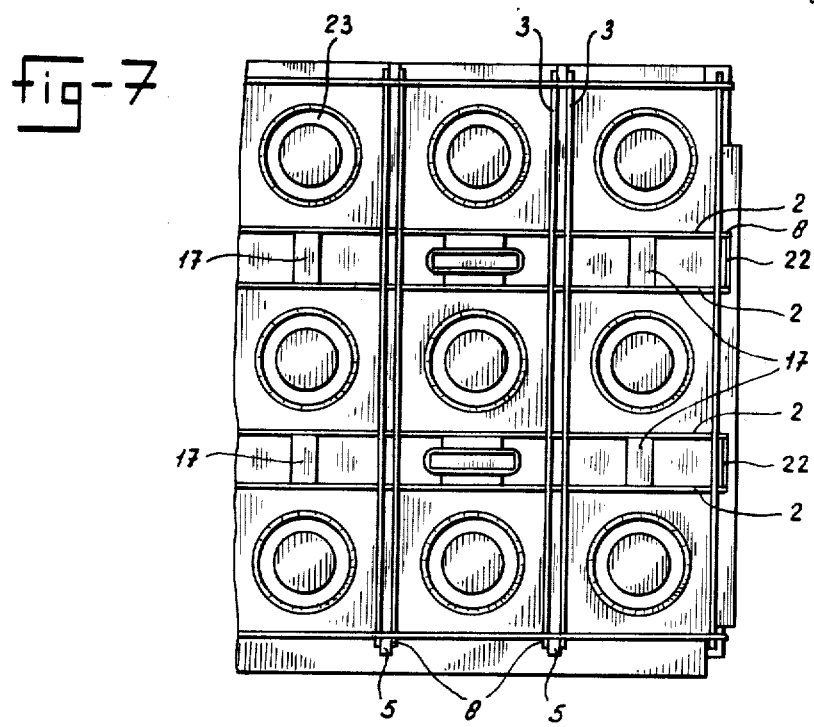

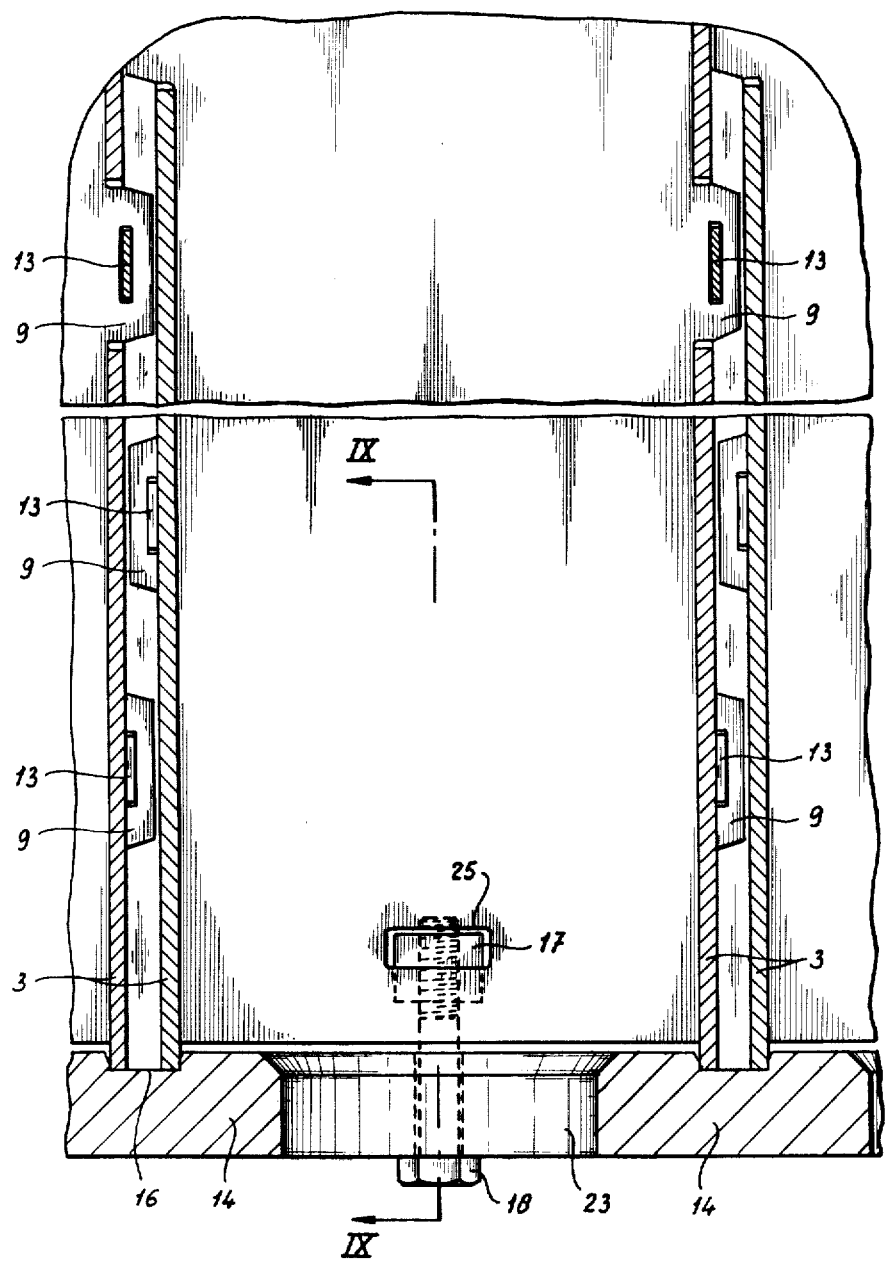

STORAGE RACK FOR THE STORAGE OF FUEL ELEMENTS OF NUCLEAR REACTORS

BACKGROUND OF THE INVENTION

1. Field of the Invention

The invention relates to a storage rack for the storage of fuel elements of nuclear reactors consisting of a sheet metal lattice arrangement constituting a plurality of abutting similar vertical storage cases or tubes having in general a rectangular cross section. In anyone of the cases of this storage rack a rod-shaped fuel element may be stored.

2. Description of the Prior Art

Within or in the neighbourhood of the reactor building there are available storage pools for storing spent or new thermal reactor fuel elements during a long or only a short period. Therein the fuel elements are placed in racks below water in such an arrangement that the necessary heat dissipation is warranted and no nuclear chain reaction may occur. Generally for such a design there are included very broad margins with respect to the mutual distances between the elements. When the storage capacity of such pools has been exhausted and the transfer of the spent fuel elements to a regeneration plant is not yet possible a temporary solution is found by placing the rods closer to each other in the pool in which case however, much more attention should be given to warrant sufficient criticality margins for the ensemble.

A possibility for reducing the mutual distance or the pitch with which the fuel elements are being placed is the inclusion in the construction of a so-called neutron poison, i.e. a material having a very high effective cross section value for the absorption of neutrons. Such a material is the boron isotope $B^{10}$ that may be included as an alloying component in the stainless steel, mostly used for the manufacture of these racks. When utilising such a material for the manufacture of the storage racks as a whole or part thereof the possibility arises of a much smaller pitch of the fuel elements and consequently of a much more compact storage than in the conventional racks.

From nuclear physic calculations it is apparent that dependent on the chosen construction, the geometry of the ensemble and the specific fuel element, there may be found an optimum ratio of the construction material and the surrounding water with respect to the fuel elements. In case of the storage racks of the above-mentioned type there exists therefore a certain interstice between the cases determining the final storage capacity.

At the found optimum any further increase of the amount of boron, i.e. the increase of the thickness of the borated sheet steel of the cases does not lead to an increase of the absorption capacity and consequently not to a decrease of the water gap or the mutual distance between the elements; that is to say that when the "saturation value" of the boron content is reached a decrease of the mutual distance between the elements will bring the ensemble closer to the criticality. Hence the effective multiplication factor will more closely approach the limit value usually assumed at 0.95.

In case of storage rack arrangements including a neutron poison the water gap between the fuel rods play an important role as a moderator for the neutrons leading to a relatively high peak of the neutron flux between the said cases. This "surge" of the neutron flux at the location of the gap and consequently also in the case walls of borated steel leads to an increased capture of neutrons and consequently to a decrease of the multiplication factor of the ensemble.

Also in case of a rack not provided with a neutron poison a decrease of the mutual distance between the elements leads to an increase of the multiplication factor after all.

In case of a given rack construction and given fuel elements a theoretical minimum distance or gap width constituted by metal and water should be maintained between the fuel elements in order to satisfy the criterion for the multiplication factor.

However, theoretical gap widths may only be applied when the storage rack may be manufactured within very close tolerances.

Up till now these storage racks have been made as a welded construction. Notwithstanding the use of welding jigs the accurate gage maintenance and the attainable straightness of the cases and other construction parts constituting the storage rack are limited by the deformations inherent to each welding process. Therefore in case of a welded construction the theoretically permissible minimum gap width has to be increased with additional safety margins in view of the necessary manufacture tolerances.

SUMMARY OF THE INVENTION

The invention now provides a storage rack of the above-mentioned type, the manufacture of which may be carried out within very close tolerances, whereby the minimum distance between the fuel elements will nearly not be affected by the manufacturing process. If for a certain fuel element having a length of for instance 4 m the width of the water gap may be for instance 25 mm, the tolerance in case of a welded construction with respect to the case walls will be ±3 mm. Due to both the adjoining cases the tolerance with respect to the water gap will consequently be ±6 mm or about 25%.

In accordance with the present invention for fuel elements having the same length, these tolerances will be ±5 mm with respect to the case walls and 1 mm with respect to the water gap, this corresponding with 4%.

In the storage rack according to the present invention the lattice arrangement has been constructed of a plurality of mutually substantially perpendicular sheet elements having sharply shaped contours, all sheet elements in one of the two perpendicular directions completely or partially traversing the lattice arrangement at a mutual distance substantially corresponding to the width of a storage case and all sheet elements in the other of the two perpendicular directions each extending only substantially over the width of one storage case, the latter narrow sheet elements at the opposite edges thereof having been provided with lugs fitting in accurately formed openings in the traversing sheet elements, said lugs having been immobilized by means of a keying, the arrangement being such that the long edges of the narrow sheet elements may be pressed tightly against the traversing sheet elements.

In accordance with one preferred embodiment of the invention all storage cases within the lattice arrangement have been separated from each other by a wall consisting of two parallel sheet elements at a short distance from each other inclusive the interstice between these sheet elements, the said interstice housing the lugs and the keyings.

The keyings may then be embodied in such a manner that of the narrow sheet elements constituting together a partition wall, the lugs have been provided at the same level, said lugs having been connected with each other by means of a connecting strip running parallel to the traversing sheet elements and that between this connecting strip and the opposite wall of the cooperating traversing sheet element a key has been pinched. The connecting strips between the lugs may be secured by welding. These welds are no such critical welds that these will cause a deformation of the rack construction.

Moreover each lug may be provided with an opening having an edge running parallel to the wall of a cooperating traversing sheet element while a key may be pinched between this edge and the wall of the traversing sheet element. In general the lugs will consist of an extended part of the sheet elements and slidably fit into slots in the cooperating sheet elements.

For securing after assembling, all keys may be welded to the traversing sheet elements, the connecting strips and the lugs, respectively. These welds are not critical either. Such securing may also be attained by deformation of the keys.

In a rectangular lattice arrangement the storage cases at each of the four outer walls of the lattice may be enclosed by a traversing sheet element extending over the entire side wall, while the sheet elements of the side walls extending parallel to the narrow sheet elements have been provided with slots for slidably receiving lugs formed on the edges of the traversing sheet elements perpendicular thereto, which lugs may then be fastened by means of a keying as described above.

For the present invention it is in particular of importance that there are manufactured sheet elements having very accurate contours and openings for the lugs, for instance with an accuracy up to 0.1 mm. Hereby and by the use of keyings instead of welding combined with bending there may be obtained particularly dimensionally stable constructions throughout the entire height and width of the storage rack. The said accuracy applies in particular to the longitudinal edges of the sheet elements.

By the use of the lattice arrangement according to the present invention in combination with a particular locking construction for the top plate and the bottom plate of the lattice, wherein no welding joints are employed either, there is provided a storage rack having a very stable construction.

The storage racks according to the present invention entail the further advantages of enabling a very accurate prefabrication of all sheet elements, an easy cleaning of all parts of the storage rack separately, this being a necessity for the storage of nuclear fuel elements. Further the absence of welds, always resulting in uncertain material properties, excludes all worries about structural changes when exposed to the ionising radiation of the fuel elements.

By keyings a very accurate assembly is possible. For the maintenance of the structural shape of the arrangement there is no necessity to use expensive assembly jigs as are required when welding. The keyings and the special construction of the storage rack by means of traversing and narrow sheet elements furthermore open the possibility of a rapid and simple exchange of parts of the rack.

Moreover separate parts of a rack may easily be controlled with respect to the cleanness thereof. There are no critical welding constructions whereby expensive weld controls may be omitted and possible faults are eliminated.

BRIEF DESCRIPTION OF THE DRAWING

The invention will now be elucidated in further detail with reference to the drawings, in which FIG. 1 schematically shows a plan view of a number of storage racks for fuel elements arranged in a water pool;

FIGS. 3, 4, 5 and 6 show details of the storage rack of FIG. 2;

FIG. 7 shows a plan view of a portion of a storage rack in accordance with another embodiment of the present invention;

FIGS. 8, 9, 10, 11 and 12 show details of the storage rack of FIG. 7; and

DESCRIPTION OF THE PREFERRED EMBODIMENTS

Figure 1:
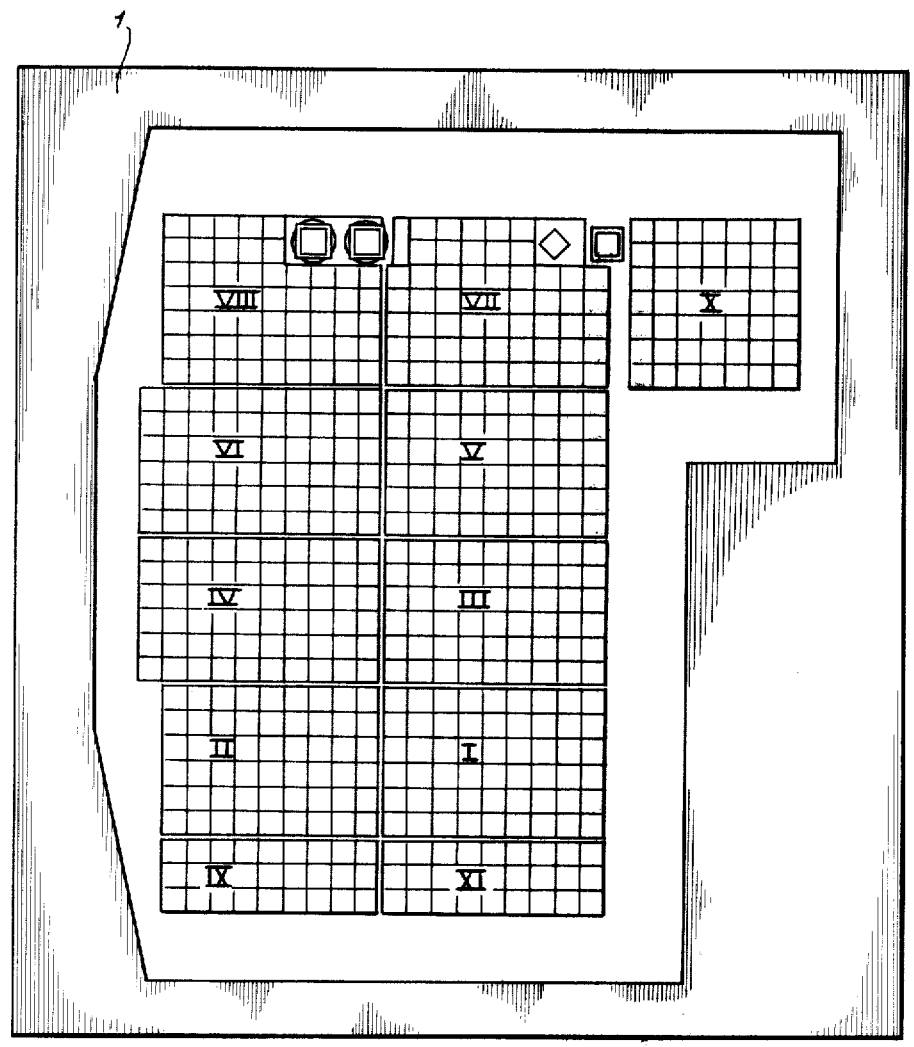

With reference to FIG. 1 there is shown a plan view of a number of storage racks indicated with the Roman FIGS. I-XI, respectively, arranged in a water pool enclosed in a tank 1 of concrete. In anyone of the spaces traced by a square drawn in the racks a fuel element may be stored.

Figure 2:
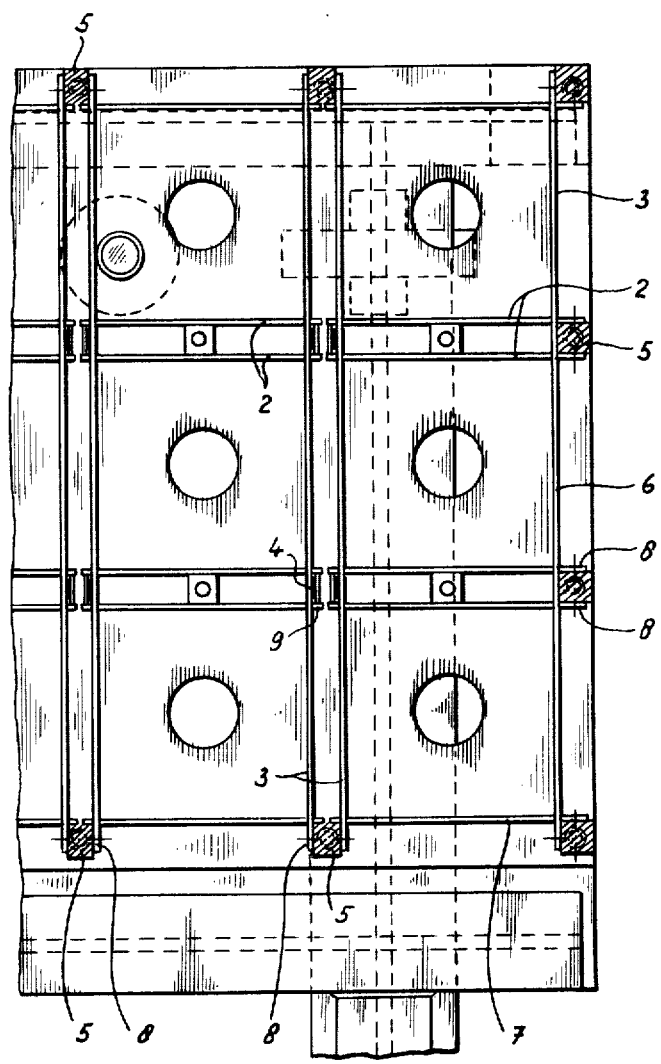
FIG. 2 shows a plan view of a portion of a storage rack in accordance with one embodiment of the present invention.

FIG. 2 shows a portion of a plan view of the rack indicated in FIG. 1 by XI, in which the top plate of the rack has been removed. The rack has been constructed of long traversing sheet elements 3 and narrow sheet elements 2 arranged between the aforesaid sheet elements 3. Hence the walls between the several cases consist of two parallel sheets including an interstice, said interstice as well as the case per se being filled with water. These two parallel sheets including the water gap determine the minimum safety distance between the fuel elements. Preferably the sheet elements consist of stainless steel having a certain boron content. The sheets of borated stainless steel absorb neutrons whereas the water gap constitutes the moderator for the neutrons.

As is apparent from FIG. 2 the sheets 3 traverse the entire length of the storage rack arrangement. Between these sheets 3 there are shown keyings generally indicated by the reference numeral 4 which keyings will be described below in further detail.

At their extremities the traversing sheets 3 have been screwed on bars or fillets 5. These fillets 5 extend over the entire height of the rack and have been screwed at the extremities thereof to a bottom plate and a top plate not shown in FIG. 2.

Outside the outer wall 6 of the rack the narrow sheet elements extending through this outer wall have been screwed by means of lugs 8 to corresponding bars or fillets 5 likewise extending over the entire height of the storage rack. For that purpose the lugs 8 run through slots in the outer wall 6. This connection is likewise described below in further detail.

As shown in FIG. 2 the outer wall 7 consists of separate narrow sheet elements provided with lugs slidably fitting into slots close to the outer edges of the traversing sheet 3. However, this outer wall 7 may also consist of a single long traversing sheet element in which case the traversing sheet elements 3 have been provided with lugs 8 slidably fitting into slots in the sheet element 7.

Figure 3:
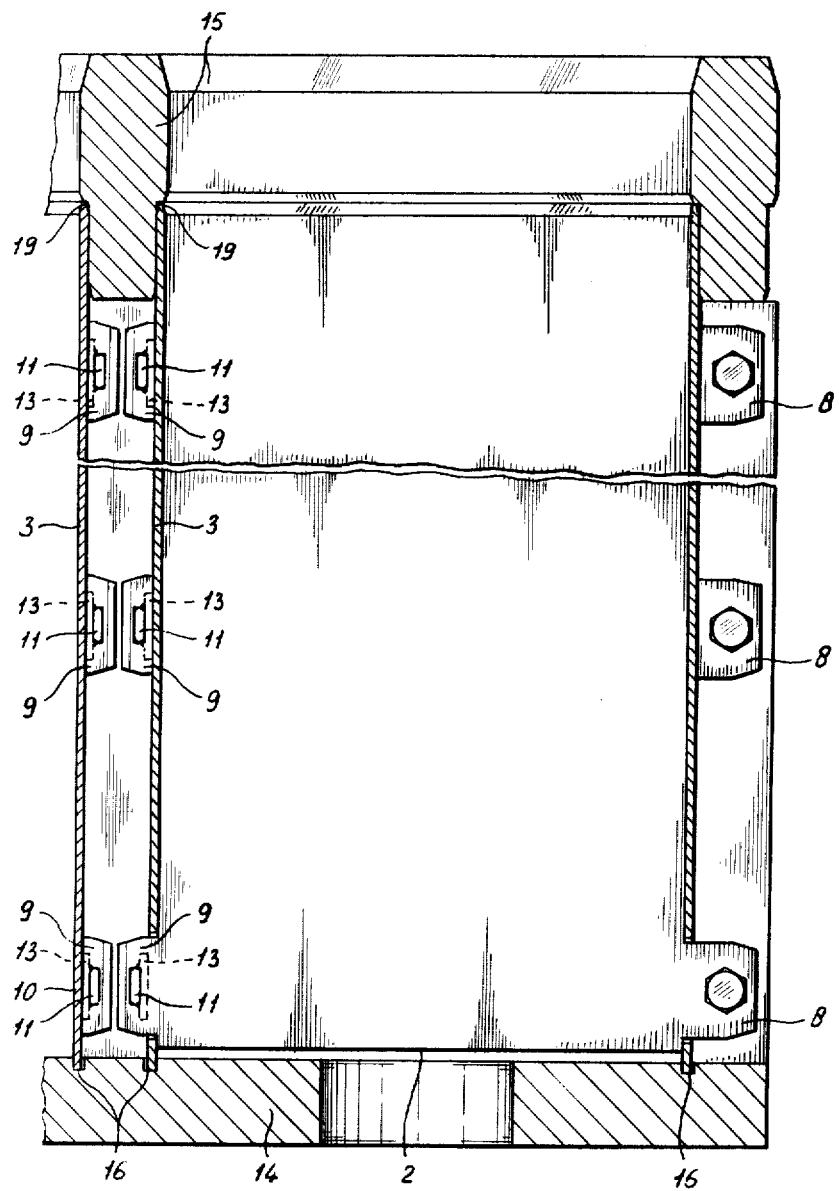

Referring to FIGS. 3 and 5 there as shown details of an example of a keying 4, by means of which the narrow sheet elements 2 may be fastened to the traversing sheet elements 3. At the same level along the longitudinal edge all narrow sheet elements have been provided with lugs 9 slidably fitting into slots 10 of which there has been shown only one in FIG. 3 at the left hand bottom part. With reference to the above description it will be clear that each intermediate wall consists of two parallel sheet elements 2 and 3. As shown in the plan view of FIG. 5 the lugs present at the same level on the narrow sheet elements 2 extend to the slots at the same level in the traversing sheet elements 3. As shown in FIG. 3 these lugs have been arranged on one line so that only one lug of each keying has been shown. Between each two lugs 9 of a wall there have been provided connecting strips which may be slid through the slots 12 in the lugs. These may then be secured by means of an edge weld or by deformation. It is evident that the separate small welds do not affect the shape of the rack arrangement in total. Keys 13 have been slid and secured between these connecting strips 11 and the adjoining wall of the traversing sheets 3. These may be likewise secured by means of welds or deformation.

With reference to FIG. 3 it will be evident that the traversing sheets 3 at the lower edges rest into slots 16 in the bottom plate 14. The lower edges of the narrow sheet elements 2 do not engage the bottom plate 14. At the upper edges each two traversing sheet elements of a partition wall include part of a beam belonging to the top plate or the upper frame 15.

FIG. 4 shows the manner in which the bottom plate 14 and the upper frame 15 are secured to the narrow sheet elements 2. If desired however, this arrangement may also be applied to the traversing sheet elements 3. In each of the narrow sheet elements 2 there has been provided a slot 25 in the lower part as well as in the upper part thereof. Lugs extending from the blocks 17 fit into this slot 25. The said blocks have been provided with a boring having an internal thread in which a screw 18 may be screwed. By means of these screws 18 the narrow sheet elements 2 may be drawn onto the bottom plate 14 and onto the upper frame 15. Consequently the traversing sheet elements 3 inclusive the lower edges thereof are firmly pressed into the slot 16, whereas the upper edges thereof are going to rest against the shoulders 19 of an upper frame beam 15. The force thus exerted on the narrow sheets 2 is transferred by means of the keyings 4 to the traversing sheets 3.

FIGS. 5 and 6 also show the pulling bars or fillets 5 outside the lattice arrangement. Onto these fillets 5 there have been screwed eyes of narrow sheet elements 2 extending to slots through the side wall of the rack consisting of a single traversing sheet element 3. On the other hand edges of the traversing sheets 3 have been screwed through the beams 5. These beams 5 have been provided with short bores at both the lower part and the upper part thereof, by means of which these beams or fillets 5 may be screwed against the bottom plate 14 and the upper frame 15, vide FIG. 6. This moreover contributes to a very stable rack arrangement.

In accordance with the embodiment of FIGS. 3 and 5 each side wall 7 of a single case consists of a single narrow sheet element. This side wall 7 may, however, also consist of a traversing sheet element through which lugs will extend formed on the upper edges of the traversing sheet elements 3. The lugs have been fastened to the fillet 5 by means of screws.

In accordance with the storage rack arrangement of FIG. 7 the intermediate walls have different widths. This possibility is created by embodying the keyings of the lugs of the narrow sheet elements 2 onto the traversing sheet elements 3 in different ways. In accordance with this arrangement there are employed narrow sheet elements 2 having lugs in the interstice between two sheet elements 3 not confronting each other but offset with respect to each other as shown in FIG. 8. These lugs 8 have been provided with slots also parallel to the traversing sheet elements 3, whereas an edge of these slots extends to the interior between the two parallel sheet elements 3. Between this edge and the opposite wall of the sheet element 3 a wedge 13 is pinched. Upon securing these wedges 13 they may be fastened by means of an edge weld to the puncheon 9 or by deformation.

The traversing sheets 3 again rest in a slot in the bottom plate at 16. Where in this case the distance between these plates 3 is much smaller there is employed a single broad traversing slot instead of two separate slots as shown for the embodiment of FIG. 2.

Figure 9:
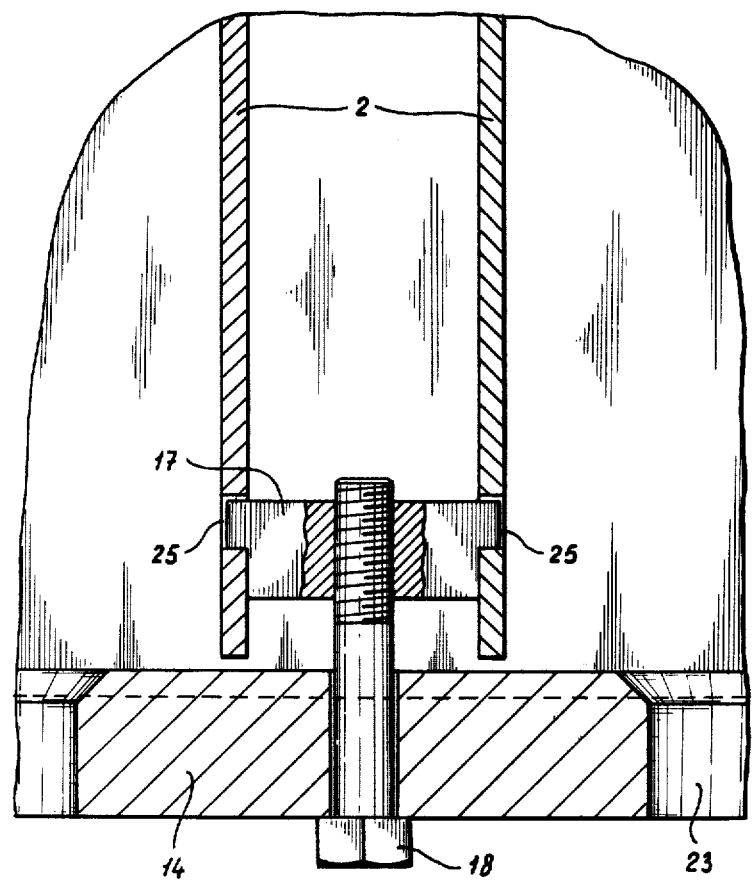

The way of securing the bottom plate 14 and the top plate not shown in these figures may be carried out in the same manner as shown for the embodiment in accordance with FIGS. 2 through 6 inclusive. With reference to FIGS. 8 and 9 there have been shown metal blocks 17 between the narrow sheet elements 2 the extending lugs of the blocks running to the opposite slots 25 provided on the lower part and, if necessary, also on the upper part of the narrow sheet elements 2 together constituting the intermediate wall. These blocks 17 on their turn have been provided with threaded bores in which a screw 18 may be screwed by means of which the sheet elements 2 may be pulled against the bottom plate 14, and, if required, against the top frame 15. Then the protruding edges of the traversing sheet elements 3 will come to rest into the slots 16 of the bottom plate and if necessary, into the slots of the top plate or against the shoulders of a top frame constituted by traverse means.

Figure 10:
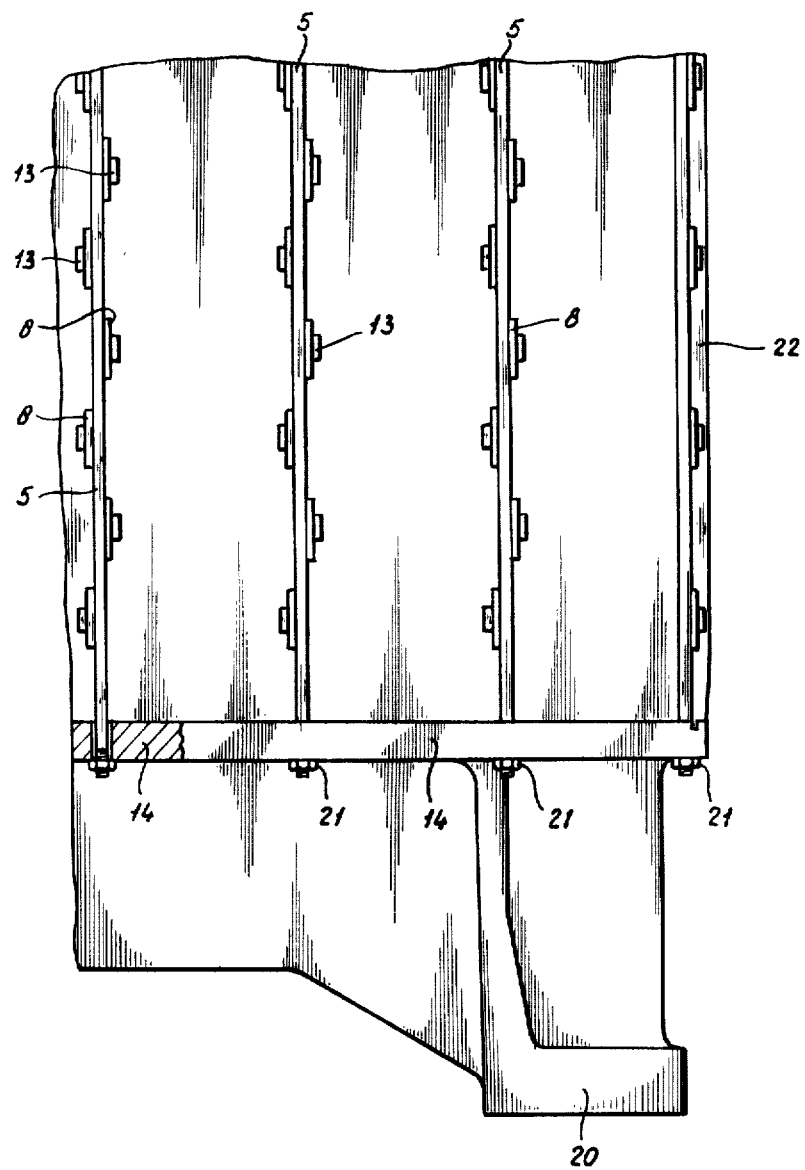
Figure 11:
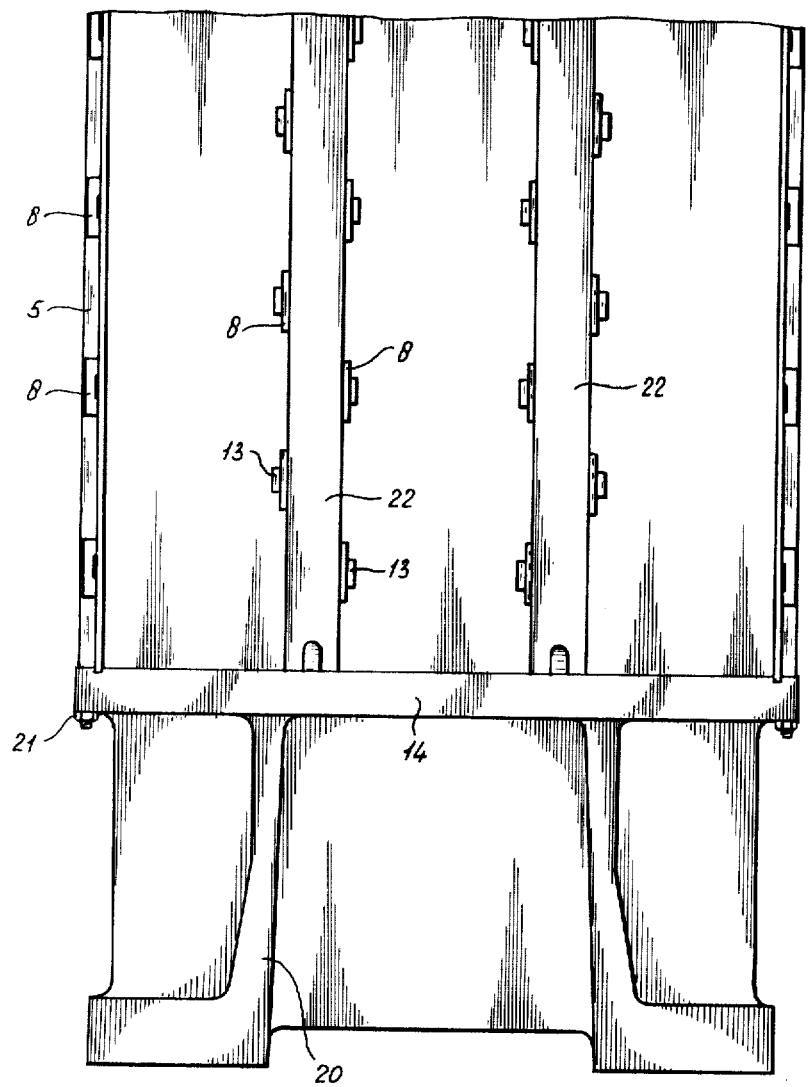

With reference to FIGS. 10 and 11 there have been shown outside views of a lower edge and of the narrow lower part, respectively, of a rack in accordance with the embodiment of FIG. 7.

The bottom plate 14 rests on a metal base 20 or has been united therewith to a single structure. In view of the fact that in accordance with this embodiment the traversing sheet elements 3 are closer to each other than in accordance to the embodiment of FIG. 2 there are employed in this case narrow pull rods 5 instead of the broad traversing side beams of the embodiment of FIG. 2. These rods have been provided at their bottom and the top ends with an external screw thread. These extremities run through openings in the bottom plate and in the top plate, which extremities are fastened by means of nuts 21. The narrow pull bars are provided between the lugs 8 of the narrow and long side walls, respectively. The lugs present on the two extremities of a pull bar 5 belong to the two parallel sheet elements of an interior wall. In view of the fact that in accordance with this embodiment the narrow sheet elements 2 are much further apart than the traversing sheet elements 3 there have been provided as is evident from FIG. 11, strips 22 instead of pull bars 5 on the narrow side wall. The same applies to the pull bars 5 which may be welded to the extremities of the lugs 8. In that case the pull bars 5 at the broad side walls of the rack arrangement will then preferably also have a rectangular cross section excluding the extremities thereof provided with a screw thread. The strips 22 may then be pulled against the bottom plate 14 by means of a hook joint. This hook joint may also be employed for the entire rack arrangement.

Figure 12:
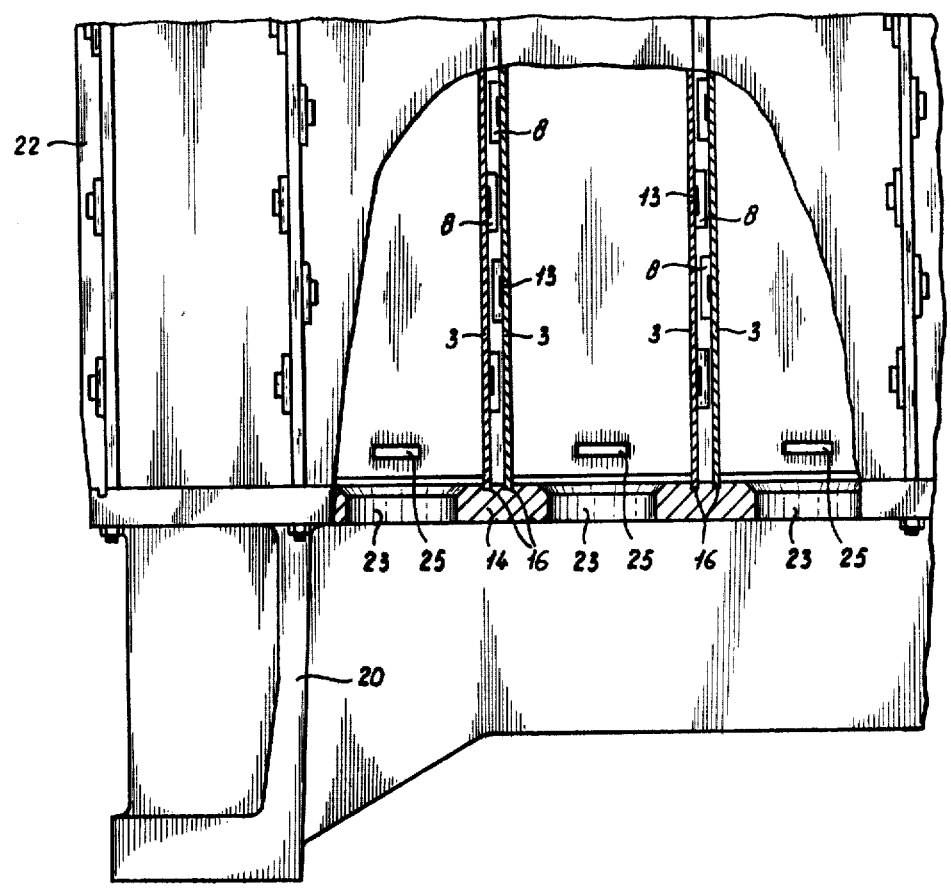

With reference to FIG. 12 there has been shown another detail of the rack arrangement in accordance with FIG. 7, that is a view partially in cross section of the lower left hand part of the rack arrangement including the carrier construction. In each storage case the bottom 14 has been provided with a circular opening 23. In the other parts of this bottom plate 14 there have been provided slots 16 wherein the lower edges of the traversing sheet elements 3 will rest in case they are pulled against the bottom plate 14 by means of the screws 18 and blocks 17 of FIGS. 8 and 9.

Figure 13:
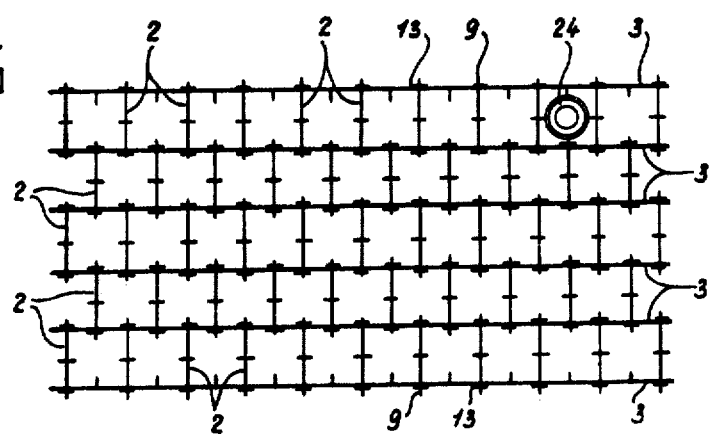
FIG. 13 shows a plan view of again another embodiment of a storage rack in accordance with the present invention.

It goes without saying that the present invention is not limited to the embodiments shown in FIGS. 2 through 12 inclusive and that modifications and alterations are possible without surpassing the scope of the invention. In this respect FIG. 13 schematically shows a plan view of another embodiment of the rack arrangement according to the invention. In accordance with this embodiment the intermediate walls between the several cases are solely provided by a single sheet. In this case these cases are constituted by the traversing sheet elements 3 and the narrow sheet elements 2 mounted transversely thereto.

Between the several traversing sheet elements 3 the narrow sheet elements 2 have been shifted half a pitch with respect to each other, i.e. half the width of the rectangular case. By means of lugs 9 the narrow sheet elements 2 run through slots in the traversing sheet elements 3. As described with respect to the above embodiments the lugs 9 also possess slots into which keys may be slid and pinched. In accordance with this embodiment the above described interior wall consists of only one sheet, although the distance between the several fuel elements, one of which has schematically between indicated at 24, remains sufficiently large, that is on the one hand because this rod rests against the outer edge of the lugs 9 of the narrow sheet elements 2 running through the slots in the traversing sheet elements 3 into the interior of the case. On the other hand on the walls of the narrow sheet elements 2 there have been provided strips or pins thus securing that the fuel element will be supported on the four longitudinal sides. When employing this embodiment the bottom plate and the top plate may be provided with slots for all sheet elements. Also in this case a particularly firm rack arrangement is warranted serviceing the minimum safety requirements.

Contrary to a welded rack the storage rack in accordance with the invention may be assembled of prefabricated cleaned parts at the site of the storage pool within the reactor building, thus eliminating the transport of the complete voluminous rack arrangement from factory to the pool.

We claim:

1. A storage rack for the storage of fuel elements of nuclear reactors consisting of a sheet metal lattice arrangement constituting a plurality of abutting similar vertical storage cases having a rectangular cross section, characterized in that said lattice arrangement is constructed of a plurality of mutually substantially perpendicular sheet elements having a sharply shaped contour, the sheet elements in one of the two perpendicular directions being continuous traversing sheet elements forming walls and extending over the widths of a plurality of cases of the lattice arrangement, two adjacent traversing sheet elements being spaced at a mutual distance substantially corresponding with the width of a storage case and all sheet elements in the other of the two perpendicular directions being narrow sheet elements each extending only substantially over the width of one storage case, the narrow sheet elements at the opposite long edges thereof being provided with lugs protruding from the edges, the traversing sheet elements having openings formed therein for receiving the lugs, said lugs having openings extending therethrough for receiving wedges, the opening in the lug being positioned on the opposite side of a traversing sheet element from the narrow sheet element when the lug is inserted through an opening in the traversing sheet element, and wedges insertable into the openings in the lugs so that the long edges of the narrow sheet elements may be pressed tightly against the traversing sheet elements.

2. The storage rack of claim 1, characterized in that the lugs of narrow sheet elements between the two juxtaposed traversing sheet elements are offset with respect to the lugs of narrow sheet elements in the adjoining regions between the traversing sheet elements.

3. The storage rack of claim 1 or 2, characterized in that within the lattice arrangement all storage columns have been separated from each other by a wall consisting of two parallel sheet elements at a short distance from each other with interstices formed between these sheet elements and that the lugs and the wedges have been situated within these interstices.

4. The storage rack of claim 1, characterized in that two narrow sheet elements together constitute a partition wall, the lugs on the elements being provided at the same level, a connecting strip running parallel to the traversing sheet elements for connecting lugs to each other and a key pinched between the connecting strip and the opposite wall of the cooperating traversing sheet element.

5. The storage rack of claim 4, characterized in that the connecting strips are welded to the lugs.

6. The storage rack of claim 4, characterized in that upon assembling the wedges are welded to the traversing sheet elements, the connecting strips and the lugs, respectively.

7. The storage rack of claim 1, characterized in that at each of the four outer walls of the rectangular lattice arrangement the storage cases are enclosed by a traversing sheet element extending over the entire side wall length and that the sheet elements of the side walls extending parallel to the narrow sheet elements are provided with slots for slidably receiving lugs formed on edges of the traversing sheet elements perpendicular thereto.

8. The storage rack of claim 7 characterized in that the rack has a bottom plate and a top plate for the lattice arrangement and that each two corresponding narrow sheet elements forming a partition wall are provided close to the lower edge and upper edge with rectangular openings facing each other, for receiving each of which a fitting lugs of a block mounted between the two narrow sheet elements within said interstice, said block being pulled toward the bottom plate or the top plate, respectively, by means of a screw.

9. The storage rack of claim 8, characterized in that at least one of the bottom plate and the top plate is provided with slits for receiving edges of the sheet elements.

10. The storage rack of claim 9, characterized in that within the space between each two lugs of a row belonging to two sheet elements forming a partition wall and extending through the outer wall, a beam is provided, said beam being connected to the lugs, said beams at the lower part and at the upper part being screwed to the bottom plate and the top plate, respectively.

11. A storage rack for fuel elements of nuclear reactors, consisting of a sheet metal lattice arrangement, constituting a plurality of adjoining equal vertical storage compartments of mainly rectangular cross section, each compartment storing one fuel element, characterized in that said lattice arrangement is constructed of a plurality of wide and narrow sheet elements, together forming walls of the compartments, said wide sheet elements being positioned mainly perpendicular to said narrow sheet elements and extending to define walls of a plurality of compartments and said narrow sheet elements extending over the width of one storage compartment, said narrow sheet elements being provided at their opposite longitudinal edges with lugs, said wide sheet elements having slots for receiving the lugs, each lug having a transverse opening for receiving a wedge, said opening after fitting of a lug through a respective one of said slots being positioned with a lug portion at the opposite side of the adjoining wide sheet elements, and a wedge insertable into said opening for tightly pressing each longitudinal edge of the narrow sheet element against the side of the adjoining wide sheet element.

12. The storage rack of claim 11, characterized in that narrow sheet elements extending between two wide sheet elements are offset with respect to narrow sheet elements in each adjoining space between one of said two wide elements and a succeeding wide sheet element.

13. The storage rack of claim 11, characterized in that adjoining storage compartments are separated from each other by walls consisting of two parallel closely spaced narrow and wide sheet elements and in that the lugs and wedges are situated within the space between two parallel closely spaced wide sheet elements.

* * * * *